US 6,530,724 B2

(12) United States Patent
Gaebelein et al.

(10) Patent No.: US 6,530,724 B2
(45) Date of Patent: Mar. 11, 2003

(54) METHOD AND SYSTEM FOR REPLACING A DAMAGED SECTION OF A CHANNEL TO WHICH AN INSERTED PART HAS PREVIOUSLY BEEN AFFIXED

(75) Inventors: Wilhelm Gaebelein, Berlin (DE); Michael Roeling, Berlin (DE)

(73) Assignee: Berliner Wasserbetriebe Anstalt des Oeffentlichen Rechts, Berlin (DE)

( * ) Notice: Subject to any disclaimer, the term of this patent is extended or adjusted under 35 U.S.C. 154(b) by 2 days.

(21) Appl. No.: 09/731,709

(22) Filed: Dec. 8, 2000

(65) Prior Publication Data

US 2001/0012477 A1 Aug. 9, 2001

(51) Int. Cl.$^7$ .................................. F16L 1/00
(52) U.S. Cl. ................ 405/184.4; 405/184.1; 405/183.5; 138/97; 138/108
(58) Field of Search ............... 405/154.1, 183.5, 405/184.1, 184.3, 184.4; 138/97, 99, 108

(56) References Cited

U.S. PATENT DOCUMENTS

| | | | | |
|---|---|---|---|---|
| 2,230,306 A | * | 2/1941 | McDonald | 138/106 |
| 3,563,276 A | * | 2/1971 | High et al. | 138/161 |
| 3,888,454 A | * | 6/1975 | Treadaway | 249/90 |
| 4,421,698 A | * | 12/1983 | Vanderlans | 138/97 |
| 4,822,211 A | * | 4/1989 | Shinoda et al. | 248/71 |
| 4,856,937 A | * | 8/1989 | Grocott et al. | 254/134.4 |
| 4,969,787 A | * | 11/1990 | Baars | 411/508 |
| 5,018,331 A | * | 5/1991 | Forzano | 52/514 |
| 5,034,254 A | * | 7/1991 | Cologna et al. | 156/307.4 |
| 5,096,332 A | * | 3/1992 | Kawafuji | 405/157 |
| 5,350,481 A | * | 9/1994 | Shepard et al. | 152/369 |
| 5,360,291 A | * | 11/1994 | Shimizu | 254/134.3 R |
| 6,400,873 B1 | * | 6/2002 | Gimblet et al. | 385/100 |
| 2002/0064351 A1 | * | 5/2002 | Uhlenhuth et al. | 385/76 |

FOREIGN PATENT DOCUMENTS

| | | |
|---|---|---|
| DE | 42 03 718 A1 | 12/1993 |
| DE | 198 35 034 C1 | 12/1999 |
| GB | 2 229 549 A | 9/1990 |

OTHER PUBLICATIONS

Internet www.jcmindustried.com/114MJSLv.html brochure from JCM Industries, JCM 114 Sleeve data, 2 pages, © 1999.*
Internet www.ramacon.nl/prod_txt.html brochure from ROMACON, 2 pages, © 1998.*
Internet www.dressercouplings.com brochures, from Dresser Equipment group Inc., and Dresser Piping Specialities, 29 pages total.*
Internet www.vikingjohnson.co.uk brochure from Viking Johnson EasiRange, 12 pages total, revised Jan. 1997.*
Instandhaltung von Kanalisationen, by Dietrich Stein, 3rd editio, Ernst & Sohn, (1999), 6 pages total including table of contents and section 5.2.1.2.*

* cited by examiner

*Primary Examiner*—J. J. Swann
*Assistant Examiner*—Katherine Mitchell
(74) *Attorney, Agent, or Firm*—Sughrue Mion, PLLC

(57) ABSTRACT

A method of replacing damaged parts of wastewater channels with inserted parts, e.g. optical cables, includes removing a section of the channel, positioning a lower half-shell (1) below the inserted part (2) at the removed section of the channel, passing an attachment element (3) having two ends (3a, 3b) around the inserted part (2), feeding the attachment element (3) through at least one opening (4, 6) of an upper half shell (5), placing the upper half shell (5) on the lower half shell (1), attaching the upper half shell (5) to the lower half shell (1), attaching the upper and lower half shells (5, 1) to neighboring channel sections, pulling the ends of the attachment element (3) tight to press the inserted part (2) against the inner surface of the channel, and filling the opening (4, 6) with a sealing compound (7).

22 Claims, 3 Drawing Sheets

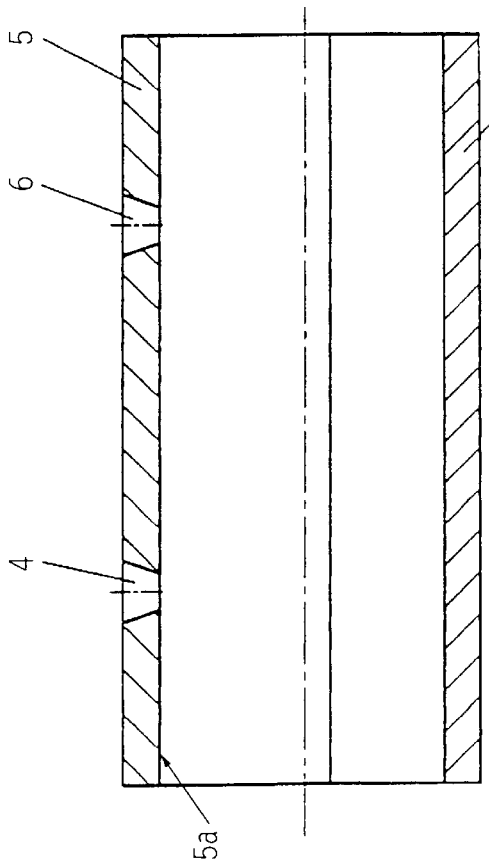
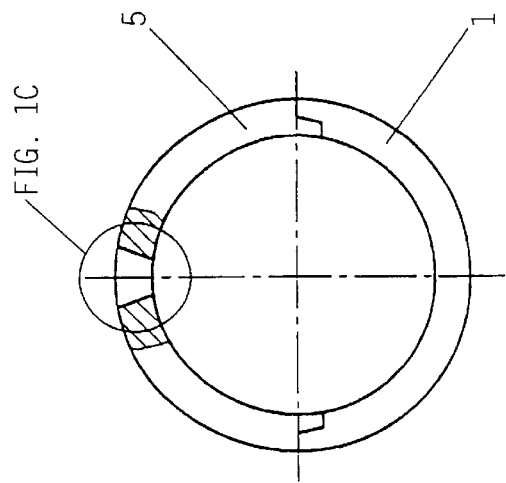
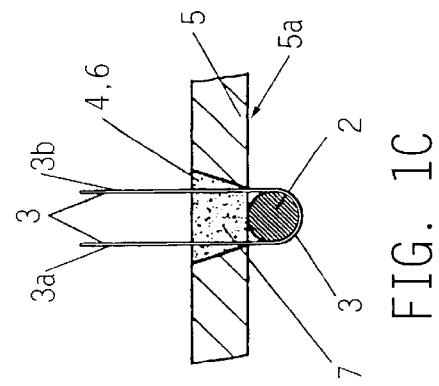

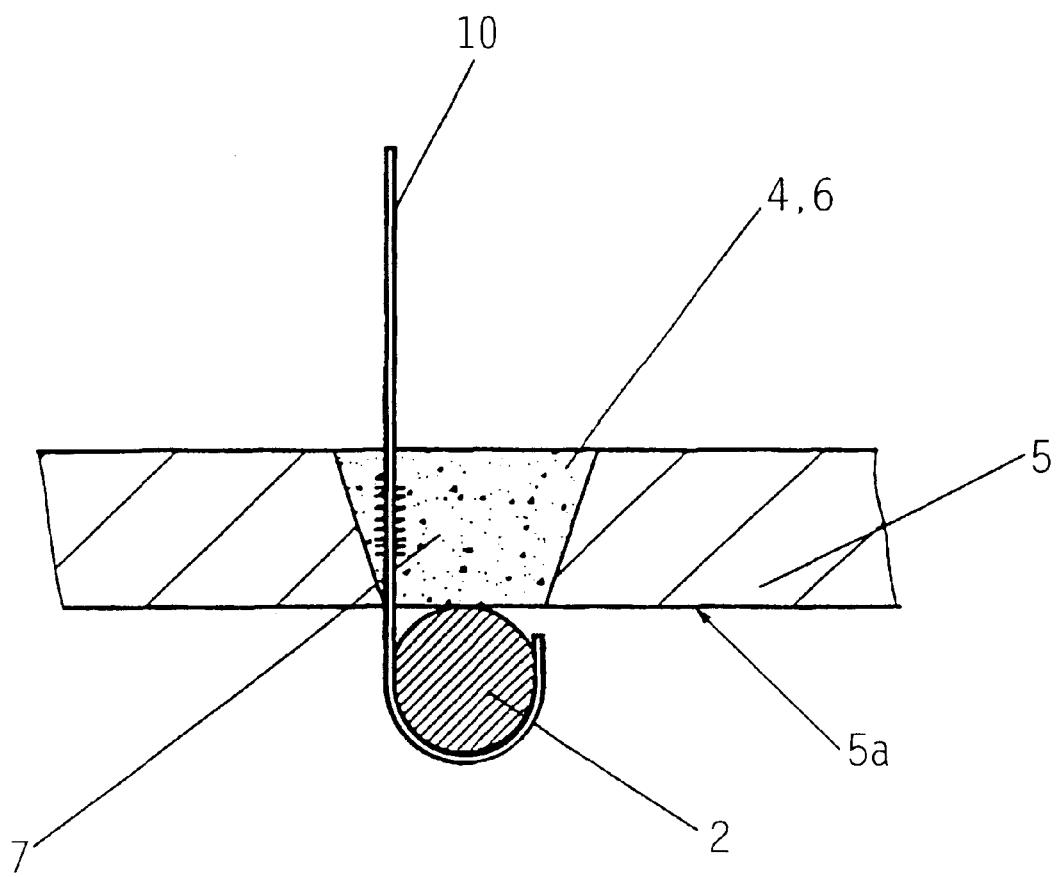

METHOD AND SYSTEM FOR REPLACING A DAMAGED SECTION OF A CHANNEL TO WHICH AN INSERTED PART HAS PREVIOUSLY BEEN AFFIXED

FIELD OF AND BACKGROUND OF THE INVENTION

The invention involves a method and system of replacing damaged sections of wastewater channels and the like, in which inserted parts, e.g. fiber optic cables, have previously been mounted.

It is known from Laid Open German Application DE 42 03 718 to use the existing pipes and channels of water supply and sewer systems for laying telecommunications cables. The cables are affixed to the inner surface of the pipes.

When replacing damaged sections of waste-water pipes, it must be ensured that the cable remains in the waste-water pipe and that the cable can continue to operate and is not damaged. Moreover, after the section of pipe is installed, the cable must be re-affixed to the inner surface of the pipe, in order to prevent dirt particles and the like from attaching themselves to the cables.

OBJECTS OF THE INVENTION

According to one object of the present invention, it is sought to provide a method that enables the replacement of damaged sections of wastewater channels bearing inserted parts, e.g. fiber optic cables. It is a further object to guarantee that the inserted parts are then re-affixed securely and/or snugly to the inner wall of the pipes.

SUMMARY OF THE INVENTION

According to one formulation, the present invention achieves these and other objectives by providing a method for replacing sections of a channel, which has a part affixed to an inner surface of the channel. In a first aspect, the method includes removing a section of the channel and positioning a lower half-shell below the inserted part at the removed section of the channel. The method further includes passing an attachment element having two ends at least partly around the inserted part and feeding at least one end of the attachment element through at least one opening of an upper half shell. The method also includes placing the upper half shell on the lower half shell and attaching the upper half shell to the lower half shell, as well as attaching the upper and lower half shells to neighboring channel sections. In addition, the method includes pulling the ends of the attachment element tight to press the inserted part against the inner surface of the channel and filling the opening with a sealing compound.

Preferably, the half shell parts are prefabricated to the required lengths and, more preferably, are of the same shape and diameter as the original channel. In addition, the openings are preferably sealed with a self-hardening sealing material. The attachment element can be a band, belt, rope, wire, clip, tongs or hook, with a smooth, ribbed or other type of surface. The attachment element can be made of various materials suited to the environment of use, e.g, a corrosion resistant material.

In a second aspect, the method includes positioning a cover plate between the inserted part and the opening. The cover plate acts as a casing, preventing the sealing compound from seeping through the opening, and/or providing an additional seal within the opening. Thus, the cover plate prevents liquid from seeping through into the joint area of the opening.

In a third aspect, the method includes feeding at least one receiving element through at least one opening of the upper half shell, hooking the inserted part into the receiving element, pulling the receiving element tight, and then filling the opening with a sealing compound. Preferably, the receiving element is hook-shaped.

The present invention is advantageous in that it provides a method and system for replacing damaged sections of waste-water channels and the like containing optical cables and the like. In preferred embodiments, it permits the use of the known and reliable technology of using prefabricated half shells. Finally, the invention provides a practicable, simple and secure method of re-affixing the optical cables to the inner surface of the channels from outside the channel.

BRIEF DESCRIPTION OF THE DRAWINGS

The invention and further advantageous refinements thereof are explained in more detail below with the aid of diagrammatic, exemplary embodiments in the drawings, in which:

FIGS. 1A–1C show, variously in partial or complete cross-section, the attachment of an optical cable to an upper half shell with conical openings;

FIG. 3 shows the attachment of a fiber optic cable using a hook-shaped receiving element and filling compound in a conical opening.

DETAILED DESCRIPTION OF THE PREFERRED EMBODIMENTS

Figure 2:
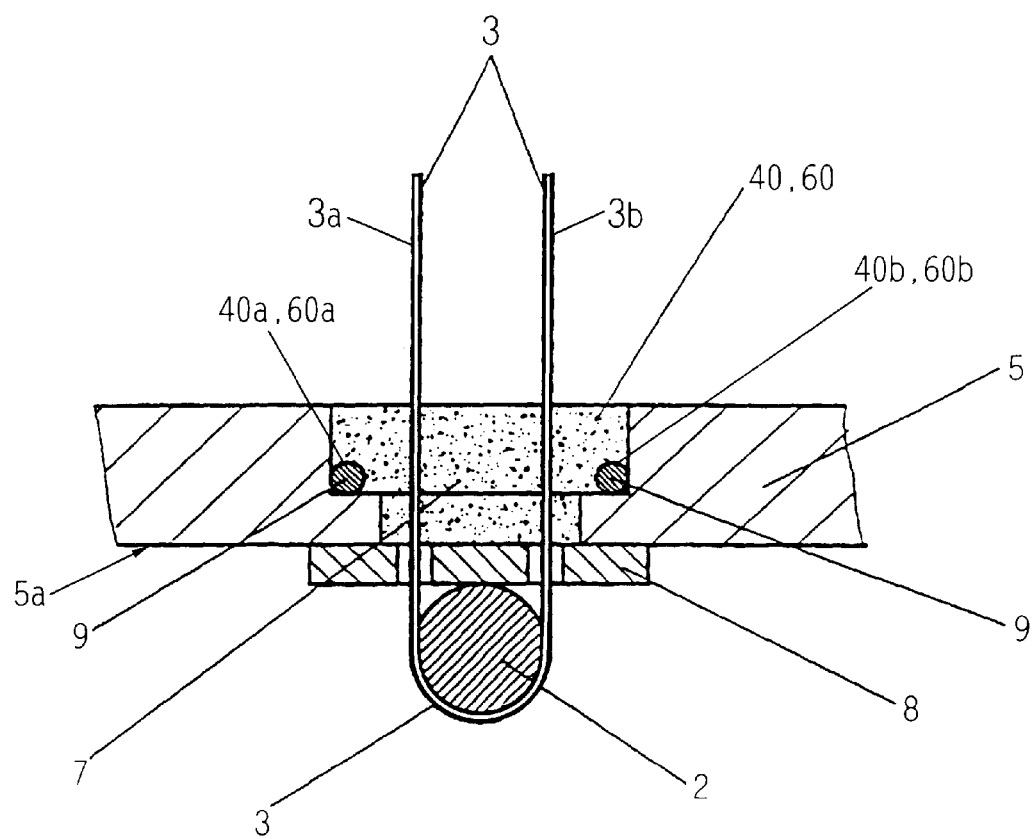
FIG. 2 shows the attachment of an optical cable to an upper half shell with tiered openings.

FIGS. 1A–1C illustrate a first embodiment of the present invention. After a pipe is excavated by digging a ditch, a damaged section of the pipe is removed without damaging a fiber optic cable 2. Then, a conventional lower half shell 1 is positioned at the damaged section of the pipe below the fiber optic cable 2. An attachment element 3 is then placed around the fiber optic cable 2, and the two free ends 3a, 3b thereof are fed through an opening 4 in the upper half shell 5.

After the upper half shell 5 is placed on top of the lower half shell 1, the joints between the half shells 1, 5 and the already existing neighboring pipe sections are sealed using well known sealing methods.

Next, the ends 3a, 3b of the attachment bands 3, which stick out of the upper half shell 5 through openings 4 and 6, are pulled tight, drawing the fiber optic cable 2 to the inner surface 5a of the upper half shell 5. To secure both the attachment bands 3 and the fiber optic cable 2, openings 4, 6 are filled with a non-shrinking filling and sealing compound 7, while the ends 3a, 3b of attachment element 3 are simultaneously held tight. Once the filling and sealing compound 7 is set and hardened, the ditch is closed.

FIG. 2 shows a second embodiment of the present invention. In the method of the second embodiment, inserted parts, such as an optical cable, are also secured by means of an attachment band and filling compound. However, this method uses tiered openings 40, 60, an additional seal 9 inserted within each of the openings 40, 60, and an additional inner cover plate 8.

A fiber optic cable 2 is secured in the same way as in the first embodiment. However, prior to feeding the ends 3a, 3b of each attachment band 3 through tiered openings 40, 60 of an upper half shell 5, a cover plate 8, which is provided with two holes 8a, 8b, is threaded on the ends 3a, 3b of each attachment band 3. Next, the ends 3*a*, 3*b* of the attachment bands 3 tight are pulled tight, drawing the cover plate 8 to the inner surface 5*a* of the upper half shell 5, while simultaneously pulling the optical cable 2 against the cover plate 8.

Before the tiered openings 40, 60 are sealed with a filling and sealing compound 7, a sealing element 9, e.g. having a swelling property, is inserted in tiered openings 40, 60. For example, a well known expanding rubber is used and is positioned in such a way that the sealing element 9 lies directly against the edges of tiered openings 40, 60.

A third embodiment of the present invention is illustrated in FIG. 3. The method of the third embodiment includes securing the inserted parts by means of a hook-shaped receiving element and filling compound in a conical opening.

In order to secure the optical cable 2, a hook-shaped receiving element 10 is fed through each of conical openings 4, 6 in the upper half shell 5. The optical cable 2 is hooked into the receiving elements 10, and by pulling the hook-shaped receiving element 10 tight, the fiber optic cable 2 is drawn to the inner surface 5*a* of the upper half shell 5. The conical openings 4, 6 are sealed in the same way as described above with respect to the first embodiment.

The above description of the preferred embodiments has been given by way of example. From the disclosure given, those skilled in the art will not only understand the present invention and its attendant advantages, but will also find apparent various changes and modifications to the structures and methods disclosed. For example, the inserted part need not be specifically a fiber-optic cable or even a longitudinally extending cable or part. It can, e.g., also be a discrete component or part. It is sought, therefore, to cover all such changes and modifications as fall within the spirit and scope of the invention, as defined by the appended claims, and equivalents thereof.

What is claimed is:

1. A method for replacing a section of a channel, which has an inserted part affixed to an inner surface of the channel, comprising:

removing a section of the channel at a removal location;

positioning a lower half shell below the inserted part at the removal location;

passing an attachment element having two ends at least partly around the inserted part;

feeding at least one end of the attachment element through at least one opening of an upper half shell;

placing the upper half shell on the lower half shell;

attaching the upper half shell to the lower half shell;

attaching the upper and lower half shells to a right and a left neighboring channel section;

pulling the ends of the attachment element tight to press the inserted part against an inner surface of the upper half shell; and filling the opening with a sealing compound.

2. The method according to claim 1, wherein the channel is an underground pipe and the inserted part is an optical cable.

3. The method according to claim 1, wherein said attaching steps comprise sealing the upper half shell to the lower half shell and sealing the upper and lower half shells to the neighboring channel sections.

4. The method according to claim 1, wherein said feeding step comprises feeding one end of the attachment element through one opening of the upper half shell and feeding the second end of the attachment element through a second opening of the upper half shell.

5. The method according to claim 1, wherein said feeding step comprises feeding the ends of the attachment element through the same opening of the upper half shell.

6. The method according to claim 1, wherein the opening is conical and has a first radius at an outer surface of the upper half shell and a second radius at an inner surface of the upper half shell, and wherein the first radius is greater than the second radius.

7. The method according to claim 1, further comprising feeding the ends of the attachment element through two holes of a cover plate, after said passing step, such that the cover plate is positioned between the inserted part and the opening.

8. The method according to claim 1, wherein the opening is tiered and has at least an outer tier at an outer surface and an inner tier at the inner surface of the upper half shell and wherein the inner tier is narrower than the outer tier.

9. The method according to claim 8, further comprising placing an expandable sealing element in upper corners of the tiered opening, prior to said filling step.

10. The method according to claim 1, wherein the attachment element is selected from the group consisting of a band, belt, rope, wire, clip, tongs, and hook.

11. The method according to claim 10, wherein the attachment element has smooth surfaces.

12. The method according to claim 10, wherein the attachment element has ribbed surfaces.

13. A method for replacing a section of a channel, which has an inserted part affixed to an inner surface of the channel, comprising:

removing the section of the channel at a given location;

positioning a lower half shell below the inserted part at the given location;

placing an upper half shell on the lower half shell;

attaching the upper half shell to the lower half shell;

attaching the upper and lower half shells to a right and a left neighboring channel section;

feeding at least one receiving element through at least one opening of the upper half shell;

hooking the inserted part into the receiving element;

pulling the receiving element tight to press the inserted part against an inner surface of the upper half shell; and filling the opening with a sealing compound.

14. The method according to claim 13, wherein the channel is an underground pipe and the inserted part is an optical cable.

15. The method according to claim 13, wherein said attaching steps comprise sealing the upper half shell to the lower half shell and sealing the upper and lower half shells to the neighboring channel sections.

16. The method according to claim 13, wherein the receiving element is hook-shaped.

17. The method according to claim 13, wherein the opening is conical and has an outer radius at an outer surface of the upper half shell and an inner radius at an inner surface of the upper half shell, wherein the outer radius is greater than the inner radius.

18. A method for replacing a section of a pipe, on an inner surface of which a part is mounted, comprising:

removing the section of the pipe without damaging the part;

clasping the part with one portion of an element and feeding a second portion of the element from an interior of a replacement section through an opening in the replacement section;

pressing the part against an inner surface of the replacement section with the element; and filling the opening with a sealant material and thereby setting the part, together with at least a portion of the element, fixedly in place in the replacement section.

19. A system for repairing a section of a damaged pipe that bears an inserted part, comprising:

a replacement section of pipe comprising at least two parts, one of said parts having an opening;

an element configured to grasp the inserted part with a first portion thereof and extend through the opening with a second portion thereof; and a sealing compound formulated to be injected into the opening and to harden after a given time, to thereby plug the opening and secure the inserted part within the replacement section.

20. The system according to claim 19, further comprising a plate having at least one hole for insertion of the element, the plate being configured to cover the opening and to be positioned between the inserted part and the opening with the element extending through the hole.

21. The system according to claim 19, wherein the element is selected from the group consisting of a band, belt, rope, wire, clip, tongs, and hook.

22. The system according to claim 19, wherein the opening has a non-cylindrical shape with a cross-sectional area smaller at an interior surface of the pipe than at an exterior surface of the pipe.

* * * * *